HYBRID COMPUTER SWITCHING SYSTEM

Filed March 21, 1967 2 Sheets-Sheet 1

INVENTOR.
EDWARD O. GILBERT

BY Richard G. Stephens

ATTORNEY

INVENTOR.
EDWARD O. GILBERT
BY Richard L. Stephens
ATTORNEY

United States Patent Office 3,475,598

Patented Oct. 28, 1969

3,475,598

HYBRID COMPUTER SWITCHING SYSTEM

Edward O. Gilbert, Ann Arbor, Mich., assignor to Applied Dynamics, Inc., Ann Arbor, Mich., a corporation of Michigan Filed Mar. 21, 1967, Ser. No. 624,781
Int. Cl. G06j *1/00;* G06g *7/12*
U.S. Cl. 235—150.5 15 Claims

ABSTRACT OF THE DISCLOSURE

A computer logic control signal or analog signal overriding switching system, in which devices connected normally to be controlled by a signal on a buss can individually be controlled or operated by selectively connected individual logic control signals or analog signals which override the buss signals to allow individual control of those devices to which selective connections are established.

Figure 1:
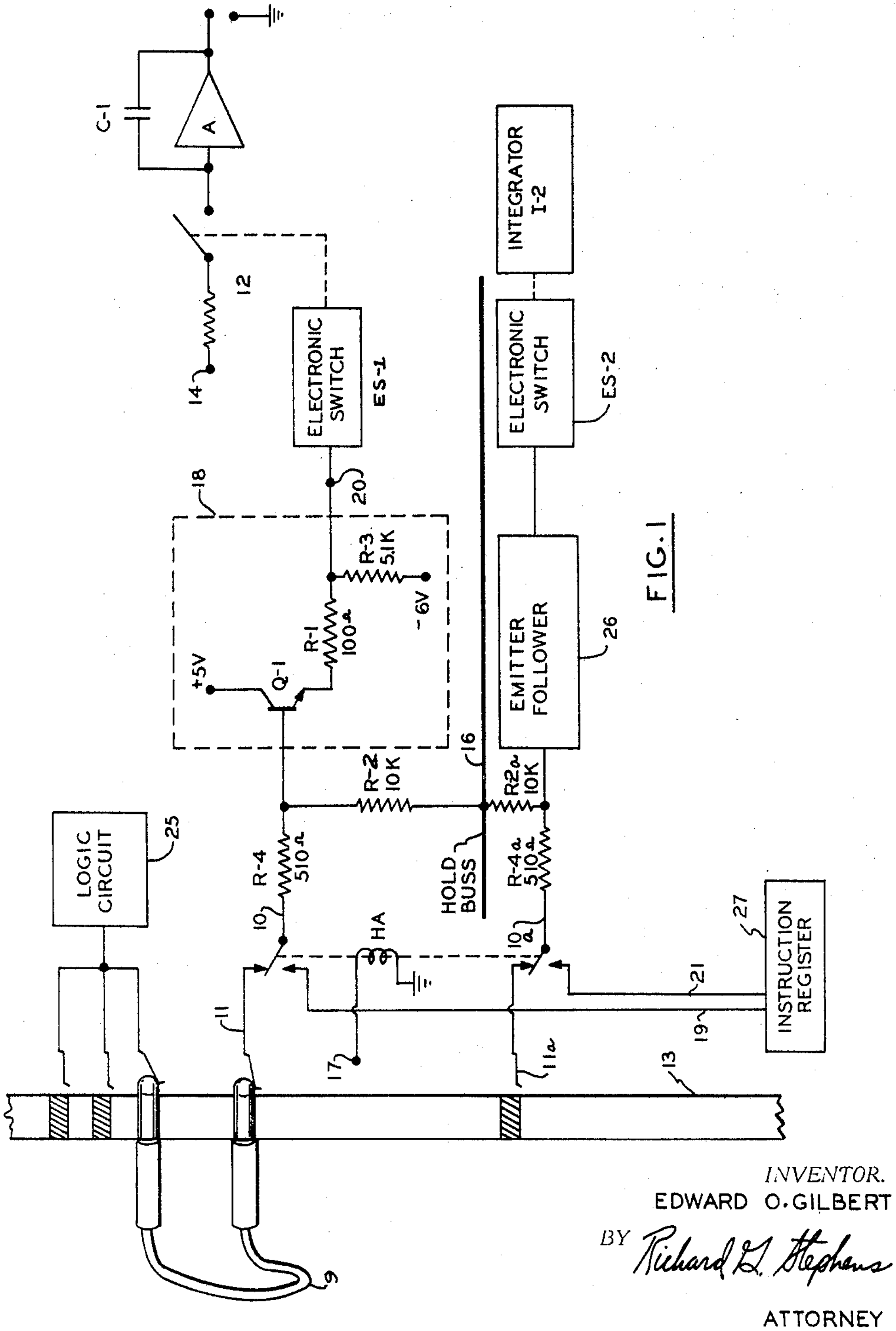

In the general-purpose computer arts generally, and particularly in the hybrid analog-digital art, wherein particular computer problems to be solved are arranged to be solved by appropriate connections of patchcords and plugs on a patchboard or plugboard, it is often desirable, in order to simplify patching, that numerous patchbay contacts be made automatically to various busses unless patchboards are inserted to provide different connections, but that any given patchbay connection be dictated by an inserted patchcord if a patchcord is intentionally inserted into the connecting patchhole. For example, it may be desired that a large number of integrators be switched to a "hold" mode when the buss is energized but that one or a few other integrators be switched instead to an "operate" mode. In the prior art such operation has been obtained by the use of mechanical "Form C" (single-pole double-throw) switches at each patchhole where such operation is desired, so that insertion of a patchcord in a given hole mechanically disconnects the corresponding patchbay conductor from a buss or the like as well as connecting the patchcord signal to the patchbay conductor. Such arrangements are identical in principle to early radio receiving sets in which insertion of earphone plugs automatically disconnect a loudspeaker. In addition to increasing the cost of the computer patchbay, such prior arrangements are undesirable because such Form C contacts make it difficult to shield the signal lines in the vicinity of the patchbay and because the contacts sometimes become dirty and fail to make contact. It is a primary object of the present invention to overcome the mentioned disadvantages of the prior system.

An increasing number of computer applications involve the interconnection of analog computers with digital computers, with the nature of various computations within the analog apparatus being determined, at least in part, by logic signals produced by the digital computer rather than by connections made at a patchboard, and it is similarly desirable in many such arrangements that certain analog computer elements be controlled from a buss in the absence of a given signal in a register which receives digital computer output signals, but so that a signal occurring in a given stage or stages of the register will override the signal on the buss.

While most applications of the invention may involve the overriding of a logic control signal on a buss by provision of a patched logic signal or a logic signal in a register, the invention is applicable as well to provision of such overriding control to substitute a selectively patched analog signal or another specially-provided analog signal, for a "normal" analog signal otherwise distributed to an analog computer element from an analog signal buss.

An important object of the present invention is to provide such selective overriding switching in a simple, reliable and economical manner. In analog signal switching versions of the invention, a particular object is to avoid the introduction of errors or offsets in the magnitudes of the analog signals.

Other objects of the invention will in part be obvious and will in part appear hereinafter.

The invention accordingly comprises the features of construction, combination of elements, and arrangements of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is an electronic schematic diagram illustrating use of the invention to provide selective control of the mode of operation of a plurality of analog computer integrator circuits.

Figure 2A:
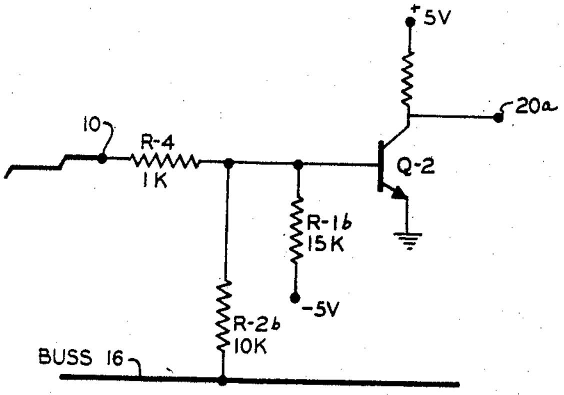
Figure 2B:
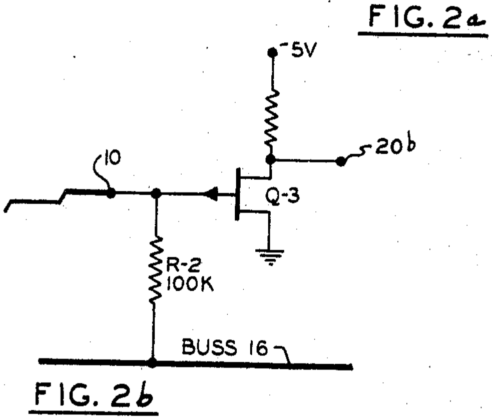

FIGS. 2*a* and 2*b* illustrate possible modifications of portions of the circuit of FIG. 1.

Figure 3:
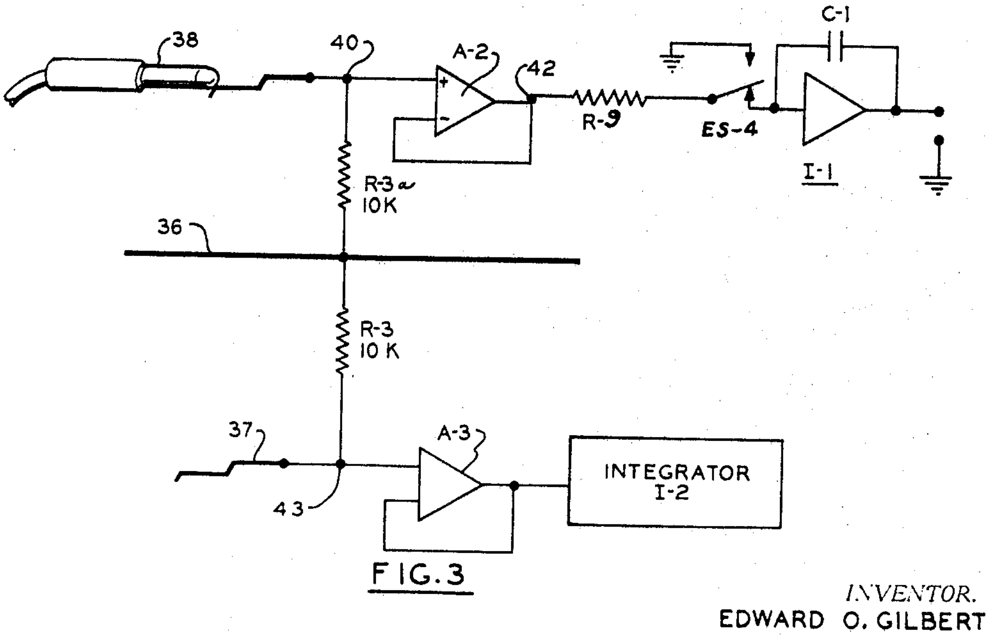

FIG. 3 illustrates one application of the invention to selectively control analog signals.

FIGURE 1 is an electrical schematic diagram of one form of the improved automatic switching system of the present invention shown connected to control a switch which determines the mode of operation of a conventional integrator circuit. A conventional electronic integrator I–1 comprising amplifier A and capacitor C–1 is provided with an electronic switch ES–1 (shown for sake of simplicity as a mechanical switch) which serves to selectively connect and disconnect the integrator summing junction terminal 12 to and from an integrator input terminal 14 (which latter terminal itself ordinarily would be carried on a computer patchboard) to switch the integrator between operate and "hold" operating modes. Electronic switch ES–1 may comprise, for example, a switch ofthe type shown in copending Application Ser. No. 374,341, filed June 11, 1964 by Elmer G. Gilbert, now Patent No. 3,371,223 or any of a variety of other known switches.

Because most computer problems require large numbers of the computer integrators to be switched simultaneously from one mode to another, it is common to provide "hold," "operate" and "reset" busses in the computer, to switch large numbers of integrators when such busses are appropriately energized, and as heretofore stated, it has been common to connect the integrators to one or more of the busses through normally-closed Form C patchboard contacts which are opened by insertion of respective patchcords. Rather than connecting the integrator switch ES–1 control terminal 20 to the "hold" buss 16 through such a mechanical contact, control terminal 20 is connected to buss 16 through an emitter follower circuit shown within dashed lines at 18 as comprising transistor Q–1 and resistors R–1, R–2 and R–3. Similarly, a second integrator I–2 is similarly controlled by electronic switch ES–2, which in turn is connected by similar emitter follower 26 to be controlled by the potential on buss 16 in the absence of any patched connection to patchbay contact 11*a*, but to be controlled by any logic signal which may be connected to contact 11*a*. The logic signals made available to contacts 10 and 10*a* are shown as emanating from patchbay contacts 11 and 11*a* through normally-closed contacts of relay HA. If the voltage is connected to terminal 17, however, to energize relay HA, the signals on lines 19 and 21 from a conventional computer instruction register 27 will override the buss 16 relay.

Assume now that relay HA is de-energized, so that terminals 10 and 10*a* are connected to patchbay contacts 11 and 11*a*. If patchcord 9 is not plugged into patchboard 13 to contact terminal 11, so that the terminal floats at a high impedance condition, the voltage level on hold "buss" 16 will be seen to control the emitter output voltage of transistor Q–1, providing approximately +5 volts at terminal 20 when buss 16 carries +5 volts and approximately zero volts when buss 16 carries zero volts. If, however, patchboard 9 applies a +5 volt logic signal or a zero-volt logic signal from logic circuit 25 to terminal 11, control of the emitter follower output voltage will be seen to be governed by the patchboard voltage, which will override the buss 16 logic signal. For example, assuming that a zero-volt signal on buss 16 is ordinarily intended to open switches corresponding to electronic switch ES–1 to put all the integrators into their "hold" modes, insertion of patchcord 9 to apply a +5 volt logic signal to terminals 10 and 11 will nevertheless establish switch ES–1 in a closed condition to put integrator I–1 in its "operate" mode. In order that the patchcord control signal override the buss control signal with substantial certainty, it is desirable that the patchcord logic signal source impedance plus the resistance of resistor R–4 be smaller by a factor of ten or more, than the impedance of R–2 plus the buss 16 source impedance. Because buss 16 is intended to drive many integrator control switches, the impedance of the device (not shown) which energizes it ordinarily will be made low enough to be ignored. As shown the output signal from logic circuit 25 may be routed to further patchbay contacts to allow patching of its logic signal to additional integrators such as I–2. The more such output circuits provided for logic circuit 25, the more necessary that its source impedance be kept low, of course.

The logic signal on patchcord 9 is shown emanating from a logic circuit 25 within the computer and in typical applications logic circuit 25 might comprise a simple flip-flop connected to be responsive to one or more signal condition, such as a comparator logic output signal resulting from an analog comparison or any one of a variety of digitally-computed signals. In order that the patchcord logic signal definitely override the buss 16 signals, it is important that logic circuit 25 have a fairly low source impedance, preferably of the order of 200 ohms with the exemplary circuit values shown in FIG. 1.

The purpose of series resistor R–4 connected between terminal 10 and the transistor Q–1 base is to prevent damage to transistor Q–1 in the event of a gross patching error, by limiting the Q–1 base current even if patchcord 9 is accidentally connected to a +10 volt signal on the patchboard, for example. It will be apparent that resistor R–4 could be omitted if only low voltage signals are terminated on the patchboard. Resistance R–1 shown connected in series with the Q–1 emitter helps prevent oscillations which otherwise sometimes occur. In many applications of the circuit of FIG. 1 resistor R–1 may be eliminated (shorted). Various changes and inversions which may be made in the circuit of FIG. 1, and in FIGS. 2*a* and 2*b* to be described below (such as the substitution of a PNP transistor for the NPN type shown) will be readily apparent to those skilled in the art.

While FIG. 1 illustrates the use of a single buss signal to control a single integrator function, the invention is applicable as well to applications in which plural busses control each computer element. For example, if two busses similar to buss 16 in FIG. 1 are connected through respective emitter followers to control two separate electronic switches, it will be seen that a total of four different switch combinations are possible, so that a given integrator connected to the two electronic switches may be connected in four different ways. Ordinarily only three of the combinations are used, to provide the "reset", "operate" and "hold" modes of an integrator.

While the overriding logic control signals are shown in FIG. 1 as being connected either by means of a patchcord or from a computer instruction register, it should be understood that such logic signals may emanate from a variety of other types of selective connection means, such as various switching matrices, in various applications of the invention.

FIGURES 2*a* and 2*b* illustrate alternate circuits which may be substituted for the emitter follower circuits of FIG. 1 to provide operation which is similar in nature to that in FIG. 1 except that a logic sign change is introduced because the Q–2 and Q–3 circuits each invert. In FIG. 2*a*, if no logic signal is patched to terminal 10, the output signal level at terminal 20*a* will be controlled by the level on buss 16, with a zero-volt signal on buss 16 cutting off transistor Q–2 to provide a +5 volt signal at terminal 20*a* and a +5 volt signal on buss 16 turning on transistor Q–2 to provide a low, substantially zero-volt signal at 20*a*. If, however, a logic signal is connected to terminal 10, it will override the buss 16 signal, but also provide a similar polarity or sign inversion in the output signal at terminal 20*a*. The emitter follower circuit of FIG. 1 has the advantages over the grounded emitter circuit of FIG. 2*a* of requiring less drive current and of overriding the buss 16 signal by a greater margin.

In FIG. 2*b*, if no logic signal is patched to or otherwise connected to terminal 10, the output voltage at terminal 20*b* will be determined by the level then existing on buss 16, with a zero-volt signal on buss 16 causing P-type field-effect transistor Q–3 to conduct and to provide a zero-volt output at terminal 20*b*, and a +5 volt signal on buss 16 causing cutoff of transistor Q–3 and a –5 volt signal at terminal 20*b*. Patching a zero or a +5 volt signal to terminal 10, however, will be seen to override the buss 16 signal, to provide a zero-volt or a –5 volt output signal, respectively, at terminal 20*b*. The circuit of FIG. 2*b*, as well as inverting will be seen to shift the system logic levels.

In FIG. 3 the basic principles of the invention are illustrated in an analog signal overriding system. Conductor 36 is assumed to carry an analog potential which might comprise the output signal of a digita-to-analog converter, or an analog function generator, or the output of an integrator (not shown), as examples. Conductor 36 is connected through resistance R–3*a* (which typically may have a resistance of about 10 kilo-ohms when 10-volt amplifiers are used) to one input line of a high-gain difference amplifier (frequently called a "differential" amplifier) A–2 preferably of a type which draws negligible input current. The output terminal 42 of amplifier A–2 is connected directly as shown, without any substantial feedback resistance to the other input line of amplifier A–2. In the absence of any signal on patchplug 38, the output voltage at terminal 42 will very closely approximate that on conductor 36 if high-gain is provided in amplifier A–2, but connection of an analog signal via patchplug 38, will override the signal on conductor 36 and provide a voltage very closely approximating the patchplug voltage on terminal 42. The analog signal at terminal 42 is shown, by way of example, connected via a scaling resistor R–9 and an integrator mode switch ES–4 (which may comprise an electronic switch) to the summing junction of integrator I–1 rather than to a mode control switch as in the logic signal-overriding versions of the invention. A further difference amplifier A–3 is also shown similarly connected to be driven by the conductor 36 signal in the absence of an overriding analog signal on patch contact 37, and it will be understood that a large group of difference amplifiers may be similarly connected to analog buss 36. Because terminal 40 is connected to the positive-gain input line of difference amplifier A–2, no sign inversion occurs in the FIG. 3 system. It also should be recognized that the overriding analog signals connected to terminals 40 and 43 may emanate from a variety of selective connection means other than patchboards or plugboards, and that the overriding signals may emanate from closure of relay contacts and electronic switching circuits.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A general-purpose electronic computer switching system, comprising, in combination: a control buss connected to receive logic signals; a plurality of controllable devices, each of said devices having a respective input terminal and being adapted to be controlled by the level of the potential applied to its respective input terminal; a patchbay having a first plurality of patch contacts and a further patch contact, each of said contacts of said first plurality being associated with a respective one of said controllable devices; a plurality of emitter-follower circuits connected respectively between said patch contacts of said first plurality and the input terminals of their associated controllable devices; logic signal-producing means connected to apply logic signals to said further patch contact; and a first plurality of impedances connected between the input circuits of said emitter-followers and said control buss, whereby the potential level on said buss will control all of said devices except any having its associated patch contact patched to said further patch contact.

2. A system according to claim 1 in which each of said emitter-follower circuits comprises a transistor having collector and emitter electrodes and a base terminal and a further impedance, in which the base terminal is connected to a respective one of said patch contacts of said first plurality, said collector electrode is connected to a first potential source and said emitter electrode is connected to the input terminal of a respective one of said controllable devices and through said further impedance to a second potential source.

3. A system according to claim 1 in which the source impedance of each of said impedances of said first plurality is at least ten times as great as the output impedance of said logic signal-producing means.

4. Apparatus according to claim 1 in which the level of the potential applied to said control buss varies between first and second voltage levels and in which said logic signals produced by said logic signal-producing means vary independently between substantially the same first and second levels.

5. Apparatus according to claim 1 in which said patchbay includes a plurality of said further patch contacts, each of said further patch contacts of said plurality being connected to receive logic signals from said logic signal-producing means.

6. A system according to claim 1 including a second logic signal-producing means for providing a further logic signal; and a selector switch means adapted to connect at least one of said emitter-follower circuits selectively between its associated patch contact and said second logic signal-producing means.

7. A general-purpose electronic computer switching system, comprising, in combination: a signal buss; means for applying a first signal to said signal buss; a plurality of computer circuits, each of said computer circuits having a respective input terminal and being responsive to the signal applied to its respective input terminal; a selective connection means including a first plurality of connectable contacts and a further connectable contact, each of said contacts of said first plurality being associated with a respective one of said computer circuits; a plurality of signal-translation circuits connected respectively between said connectable contacts of said first plurality and the input terminals of their associated computer circuits; means for applying a second signal to said further connectable contact; and a first plurality of impedances connected between the input circuits of said signal-translation circuits and said signal buss, whereby said first signal on said signal buss will control all of said computer circuits except any of said computer circuits having its associated connectable contact of said first plurality connected to said further connectable contact.

8. A system according to claim 7 in which said means for applying said first signal to said signal buss comprises logic signal-producing means operative to apply a signal to said buss which varies discretely between two possible levels, and in which said computer circuits comprise digital logic circuits.

9. A system according to claim 7 in which said means for applying said first signal to said signal buss comprises means for producing a continuously-variable analog signal, and in which said computer circuits are responsive to analog signals.

10. A system according to claim 7 in which said selective connection means includes patchboard means which may be selectively patched to connect said further connectable contact to one or more of said contacts of said first plurality.

11. A system according to claim 7 in which said selective connection means includes relay means which may be operated to connect said further connectable contact to one or more of said contacts of said first plurality.

12. A system according to claim 8 in which at least one of said signal-translation circuits comprises a transistor emitter-follower circuit.

13. A system according to claim 8 in which at least one of said signal-translation circuits comprises a transistor grounded-emitter circuit.

14. A system according to claim 8 in which at least one of said signal-translation circuits includes a field-effect transistor connected to be switched between conducting and non-conducting states in accordance with the potential existing on the respective connectable contact of said first plurality associated with said one of said signal-translation circuits.

15. A system according to claim 9 in which at least one of said signal-translation circuits includes a high-gain difference amplifier having first and second input circuits and an output circuit, said first input circuit being connected to the associated connectable contact of said first plurality and said second input circuit being connected to said output circuit.

References Cited

UNITED STATES PATENTS

| | | | |
|---|---|---|---|
| 3,205,345 | 9/1965 | Gruet | 235—150.4 X |
| 3,231,722 | 1/1966 | Stern | 235—150.4 |
| 3,231,723 | 1/1966 | Gilliland et al. | 235—150.4 |
| 3,366,894 | 1/1968 | Newcomb | 307—229 X |
| 3,401,344 | 9/1968 | Andrus et al. | 307—229 X |
| 3,402,353 | 9/1968 | Hubbs | 307—229 X |

MALCOLM A. MORRISON, Primary Examiner

J. F. RUGGIERO, Assistant Examiner

U.S. Cl. X.R.

307—229